Patented Dec. 19, 1922.

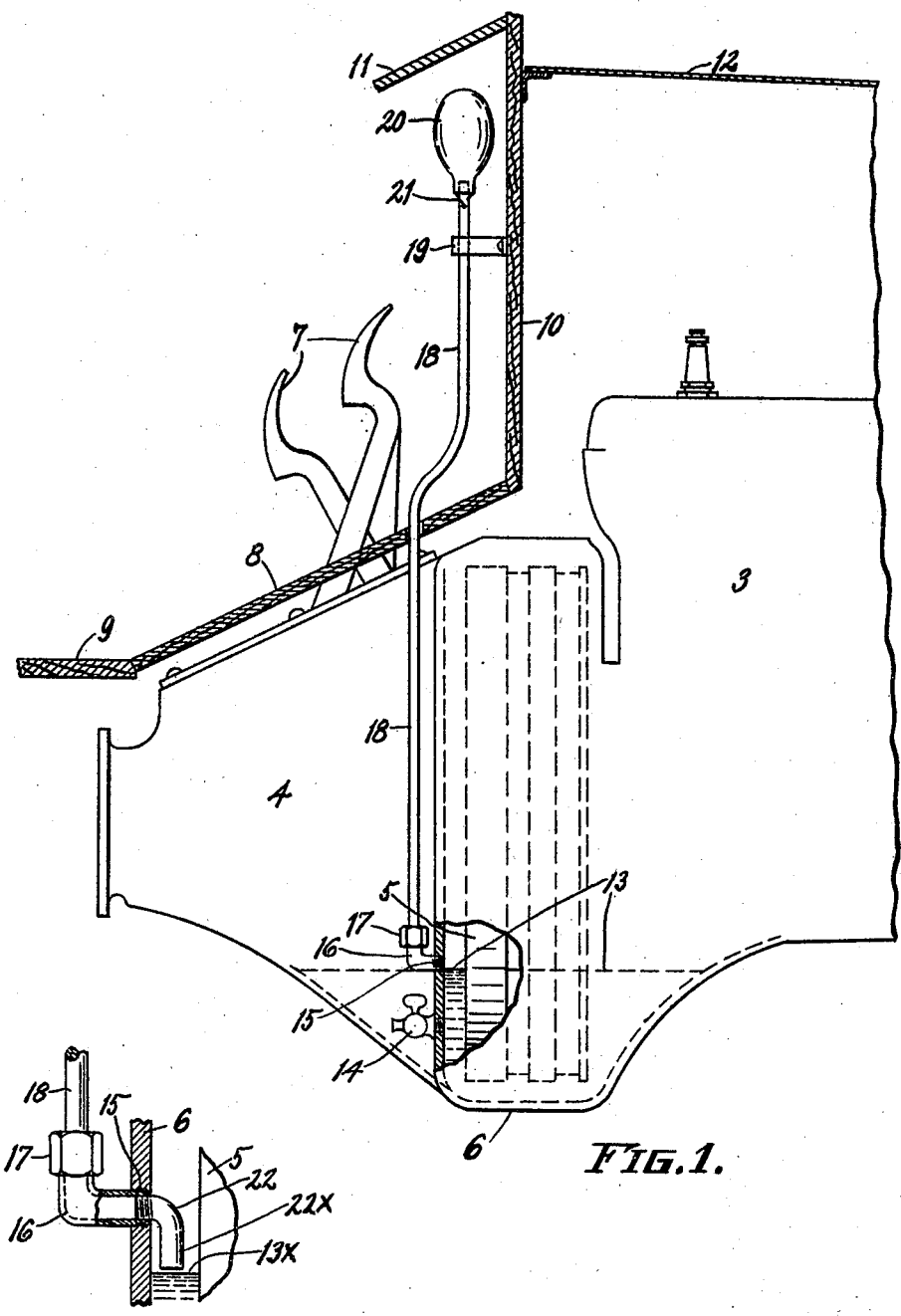

1,439,258

UNITED STATES PATENT OFFICE.

OSCAR L. OLSON, OF BRAHAM, MINNESOTA, ASSIGNOR OF ONE-HALF TO ALFRED OLSON, OF STANCHFIELD, MINNESOTA.

OIL-SUPPLY INDICATOR FOR AUTOMOBILES.

Application filed May 29, 1922. Serial No. 564,314.

*To all whom it may concern:*

Be it known that I, OSCAR L. OLSON, a citizen of the United States, residing at Braham, in the county of Isanti and State of Minnesota, have invented certain new and useful Improvements in Oil-Supply Indicators for Automobiles, of which the following is a specification.

My invention relates to oil supply indicators for automobile engines of the type having an oil chamber with upper and lower pet cocks for determining the amount of oil in the engine crank case.

The object of my invention is to provide a simple and efficient device by which the driver of an automobile can readily determine if there is enough oil in the crank case without getting out of the car and manipulating the pet cocks or to look at a sight gage from under the running board of the car.

In the accompanying drawing:

Fig. 1 is a side view, partly in section, of an automobile engine with my device applied to it and some of the adjacent automobile parts shown in section.

Fig. 2 is an enlarged modified view of that part of the engine and my device shown in section in Fig. 1.

Referring to the drawing by reference numerals I have illustrated that part of a Ford type automobile to which my device is applicable consisting of the rear portion of the engine 3, its transmission housing 4 inclosing the fly wheel 5, the lower portion of said housing comprising an oil chamber 6. 7 are the foot pedals, 8 the foot board, 9 the floor board, 10 the dash, 11 the instrument board and 12 the hood of the automobile in approximately correct relation to the motor. 13 indicates the oil level usually maintained in any auto of the type mentioned, said level usually being above the pet cock 14 and below the threaded hole 15 in the oil chamber to insure proper lubrication of the engine parts.

In said threaded hole I engage one end of a pipe L 16, the other arm of the L extending vertically to receive a nut 17 from the upper end of which a tube 18 preferably made of copper, is extended upwardly to a point below the instrument board 11 and may be held securely in a bracket 19 secured to the dash 10 (see Fig. 1). A rubber bulb 20 is secured on the upper end of of pipe 18 and just below the bulb I cut a small aperture 21 in said pipe for a purpose to be described.

Assuming that an oil level is to be maintained between the drain cock 14 and the hole 15 in the oil chamber, my device is used as follows to determine whether there is enough oil in the oil chamber.

The operator merely squeezes bulb 20 flat with one hand and then releases it. If the oil level is at or above the level of the L 16 the bulb will fill with air very slowly, being unable to draw air through the L 16 and up pipe 18, but will instead draw air slowly through aperture 21 in the pipe 18. This indicates to the operator that there is enough oil in the crank case. However, if the bulb fills with air very quickly it indicates that there is no oil at the level of the inner end of the L 16 as air will be drawn freely up through tube 18. The remedy is of course to pour enough oil in the crank case until the proper level has been reached.

17 is the type of nut, common in automobile practice, having threads to engage the upper end of the L 16 and an internal seat and holding means (not shown) for the lower end of pipe 18.

In some cars it is desirable to maintain a lower oil level, as 13$^x$ in Fig. 2, and for this purpose I provide another pipe L 22 having external threads to engage internal threads at the inner end of L 16, the other arm 22$^x$ of L 22 being of any length desired and extended downwardly, as shown in Fig. 2, to maintain oil level 13$^x$.

What I claim is:

In an automobile engine having an oil tank or chamber, a vertically disposed tube having its lower end connected with the lower portion of the said chamber, its body provided with a small lateral aperture and its upper end with an air sucking device; said air sucking device serving to indicate the level of the oil supply in the chamber by drawing air rapidly through the tube when the oil is below the lower end of the tube, and drawing air slowly when the oil is above the lower end of the tube so that air can only be sucked through the side aperture in the tube.

In testimony whereof I affix my signature.

OSCAR L. OLSON.